(12) United States Patent
Hallberg et al.

(10) Patent No.: US 9,148,850 B2
(45) Date of Patent: Sep. 29, 2015

(54) METHOD AND A RADIO BASE STATION FOR HANDLING OF DATA TRAFFIC

(75) Inventors: Helene Hallberg, Södertälje (SE); Jacob Österling, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 398 days.

(21) Appl. No.: 13/496,893

(22) PCT Filed: Sep. 21, 2009

(86) PCT No.: PCT/SE2009/051048
§ 371 (c)(1),
(2), (4) Date: May 16, 2012

(87) PCT Pub. No.: WO2011/034476
PCT Pub. Date: Mar. 24, 2011

(65) Prior Publication Data
US 2012/0289224 A1    Nov. 15, 2012

(51) Int. Cl.
*H04W 52/02* (2009.01)
*H04W 52/22* (2009.01)
(Continued)

(52) U.S. Cl.
CPC ........ *H04W 52/0206* (2013.01); *H04W 52/223* (2013.01); *H04W 28/10* (2013.01); *H04W 52/143* (2013.01); *H04W 52/367* (2013.01); *Y02B 60/50* (2013.01)

(58) Field of Classification Search
CPC . H04W 52/367; H04W 52/346; H04W 52/28; H04W 52/343; H04W 52/0203; H04W 52/0206; H04W 52/02; H04W 52/223
USPC .................................................. 455/522, 561
See application file for complete search history.

(56) References Cited

U.S. PATENT DOCUMENTS 6,584,330 B1    6/2003  Ruuska
2006/0182262 A1*  8/2006  Goldman et al. ............. 379/323
(Continued)

FOREIGN PATENT DOCUMENTS

CN    1887003 A    12/2006
EP    1521376 A1    4/2005
(Continued)

*Primary Examiner* — Nam Huynh
(74) *Attorney, Agent, or Firm* — Murphy, Bilak & Homiller, PLLC

(57) ABSTRACT

The invention relates to an arrangement (130) in a radio base station (10) for handling data traffic within a cell of the radio base station (10), which radio base station (10) is comprised in a telecommunications network. The arrangement comprises a determining unit (131) arranged to determine a maximum power, which maximum power indicates available power to radio base station (10). In addition, the arrangement comprises a comparing unit (132) arranged to compare the maximum power to a threshold power value, and a handling unit (133) arranged to handle data traffic served by the radio base station (10) according to a shaper rule when the maximum power is below the first threshold power value. The shaper rule is defined to handle data traffic in such a way that an amount of data traffic transmitted over a time period is reduced consuming less power of the radio base station (10) than if the data traffic is handled according to a basic rule when the maximum power is above the threshold power value.

15 Claims, 13 Drawing Sheets

(51) Int. Cl.
*H04W 28/10* (2009.01)
*H04W 52/14* (2009.01)
*H04W 52/36* (2009.01)

(56) References Cited

U.S. PATENT DOCUMENTS

2007/0191076 A1* 8/2007 Hageman et al. ............. 455/574
2008/0058995 A1 3/2008 Holindrake et al.
2010/0009694 A1* 1/2010 Fischer ..................... 455/452.1

FOREIGN PATENT DOCUMENTS

EP 2083170 A1 7/2009
WO 2008/064925 A1 6/2008

* cited by examiner

METHOD AND A RADIO BASE STATION FOR HANDLING OF DATA TRAFFIC

TECHNICAL FIELD

The invention relates to a radio base station and a method in a radio base station comprised in a telecommunications network. In particular, the invention relates to handle data traffic within a cell of the radio base station.

BACKGROUND

In previous work on enhancing the energy efficiency of radio networks, solutions have been considered for energy savings on a Radio base station (RBS) level. For example, a radio base station may operate in a low power mode during low data traffic hours. An area of equal importance that has obtained less attention is the dimensioning of the power backup system, and in the power supply system of a radio site comprising radio base stations. The power supply system of a radio base station may comprise the main electrical network but may also comprise a typical off grid site solution of different energy sources, such as solar, wind, diesel, water and/or the like.

Today's radio base station products ways to limit the energy consumption are limited. There are features proposed to reduce the power consumption based on the current data traffic load, but the operation of the radio base station is directed to save power consumption decreasing the operating expenditures.

SUMMARY

The object of embodiments herein is to provide a mechanism for operating a radio base station in an energy flexible manner.

The object is achieved by providing a method in a radio base station. The method is for handling data traffic within a cell of the radio base station, which radio base station is comprised in a telecommunications network. The radio base station determines a maximum power, which maximum power indicates available power to radio base station. The radio base station then compares the maximum power to a threshold power value. The radio base station handles data traffic served by the radio base station according to a shaper rule when the maximum power is below the first threshold power value. The shaper rule is defined to handle data traffic in such a way that an amount of data traffic transmitted over a time period is reduced consuming less power of the radio base station than if the data traffic is handled according to a basic rule when the maximum power is above the threshold power value.

In order to perform the method an arrangement in a radio base station is provided. The arrangement comprises a determining unit arranged to determine the maximum power. The arrangement further comprises a comparing unit arranged to compare the maximum power to the threshold power value. In addition, the arrangement comprises a handling unit arranged to handle data traffic served by the radio base station according to the shaper rule when the maximum power is below the first threshold power value.

This will lead to reduced capital expenditures in that the radio base station operates based on what is "given" to the radio base station instead of having to dimension the power supply system based on the radio base station requirements. Hence, the radio base station will operate in an energy flexible manner.

BRIEF DESCRIPTION OF THE DRAWINGS

Embodiments will now be described in more detail in relation to the enclosed drawings, in which.

DETAILED DESCRIPTION

Figure 1:
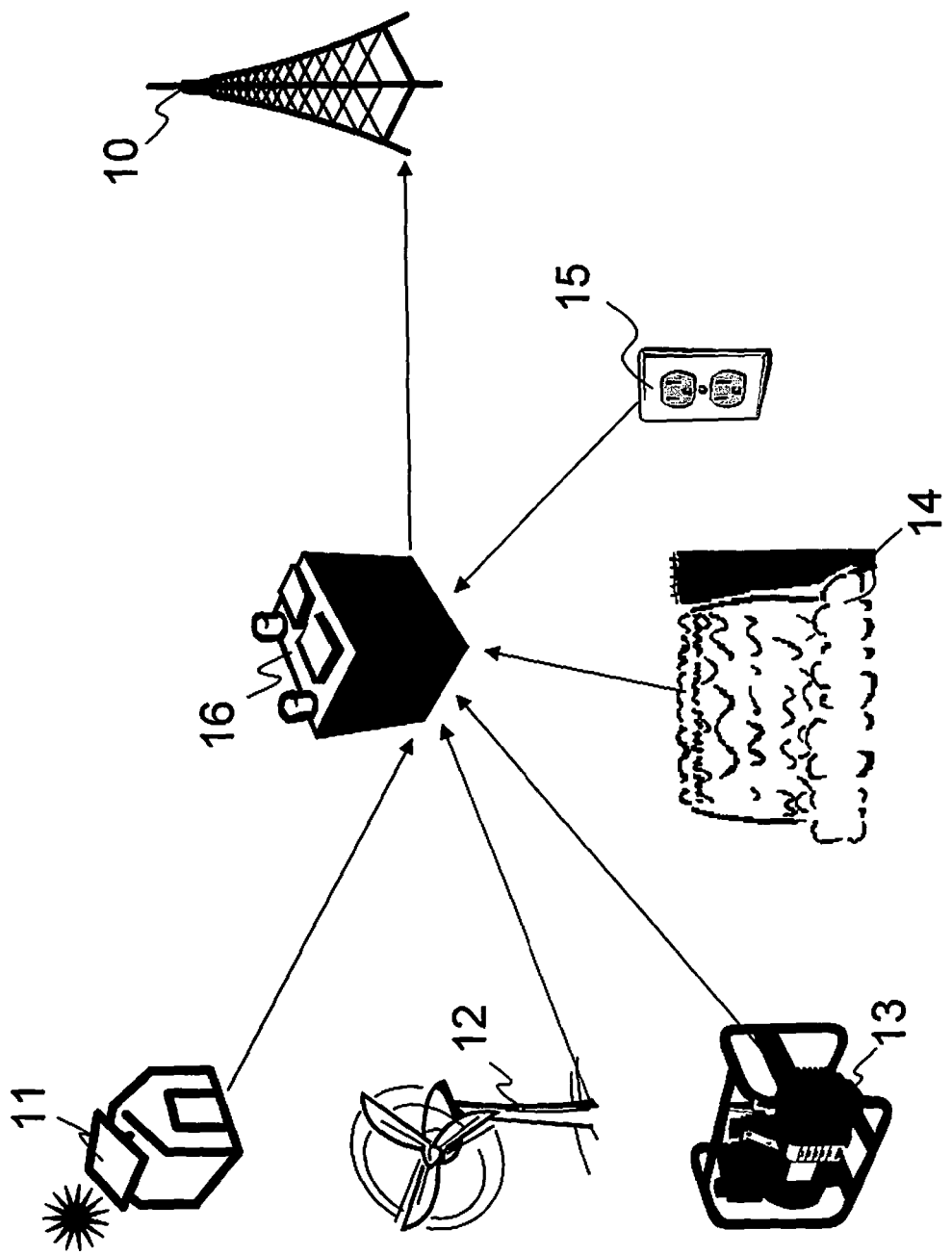
FIG. 1 is a schematic diagram showing a power supply system connected to a radio base station.

In FIG. 1, a schematic overview of a power supply system of a radio base station 10 (RBS) is shown. The power supply system may comprise an off grid solution wherein the radio base station 10 is supplied with power from different energy sources, such as solar arrangement 11, wind arrangement 12, diesel arrangement 13, water arrangement 14 and/or the like. The radio base station 10 may also be connected to, and power supplied by a main electrical network 15, as shown in FIG. 1. These different energy sources may supply energy to a battery 16 that accumulates the energy that in its turn supplies the radio base station 10 with power. The battery 16 may comprise by a single or a plurality of battery units.

One role of the radio base station 10 is to route all data traffic to and from user equipments in a cell or cells being served by the radio base station 10. The radio base station 10 is comprised within a telecommunications network, which telecommunications network may comprise a Global System for Mobile communications (GSM) network, a Wideband Code Division Multiple Access (WCDMA) network, a Long Term Evolution (LTE) network as well as to other networks. The radio base station 10 may be denoted as NodeB or eNodeB in some of the networks.

Since data traffic to and from the user equipments in the cell or cells of the radio base station 10 is routed via the radio base station 10, which radio base station 10 will be a major consumer of power or energy in the telecommunications network. According to embodiments herein it is enabled to hook up the radio base station 10 and run a data traffic handling mechanism, a data traffic shaper, and thereby control the power consumption of the radio base station 10 based on the factual power availability, an input power value and/or a prediction of future power availability. In the illustrated examples, an indication of available power is denoted as a maximum power, Pmax, indicating available power to radio base station. Available power herein means present and/or future available power.

The radio base station 10 has a different Pmax at different situations and the radio base station 10 needs to take the Pmax into consideration when handling data traffic. To handle and shape the data traffic the traffic shaper is introduced in the radio base station 10. The traffic shaper operates in dependence of, for example;

Information about the currently available backup power, for example, diesel reserve and/or battery reserve, Information about the current power generation from the power supply systems, for example, solar, wind, and/or diesel power generation, Information about the current data traffic demand, Predictions on expected future power generation or production, for example, based on wind forecast, solar radiation forecast and/or diesel refill forecast, and/or Predictions of expected future data traffic demand, for example, from an operation and maintenance (O&M) system.

The traffic shaper may adaptively adjust the amount of data traffic as well as the types of data traffic served, taking Quality of Service (QoS) optimization into account. By basing the data traffic shaping and thereby the radio base station 10 power consumption on available energy at present and/or future, the operator have the possibility to dimension the energy backup system for a certain degree of service, e.g. support full service for 2 h, and then only emergency calls for the next 10 hours.

The operator also have the possibility to use alternative energy sources, such as solar and/or wind power, with a selected average power generation, and have the system behavior adapt to expected energy production.

The operator, may in some embodiments, have active control of the dimensioning of the energy supply system, as theta data traffic as well as future energy production is predicted and since the behavior of the radio base station 10 may be adopted to such knowledge if it is available. This will lead to reduced capital expenditures in that the radio base station 10 operates based on what is "given" to the radio base station 10 instead of having to dimension the power supply system based on the radio base station 10 requirements.

There are alternative ways of predicting the power generation of a power supplier disclosed below.

Figure 2:
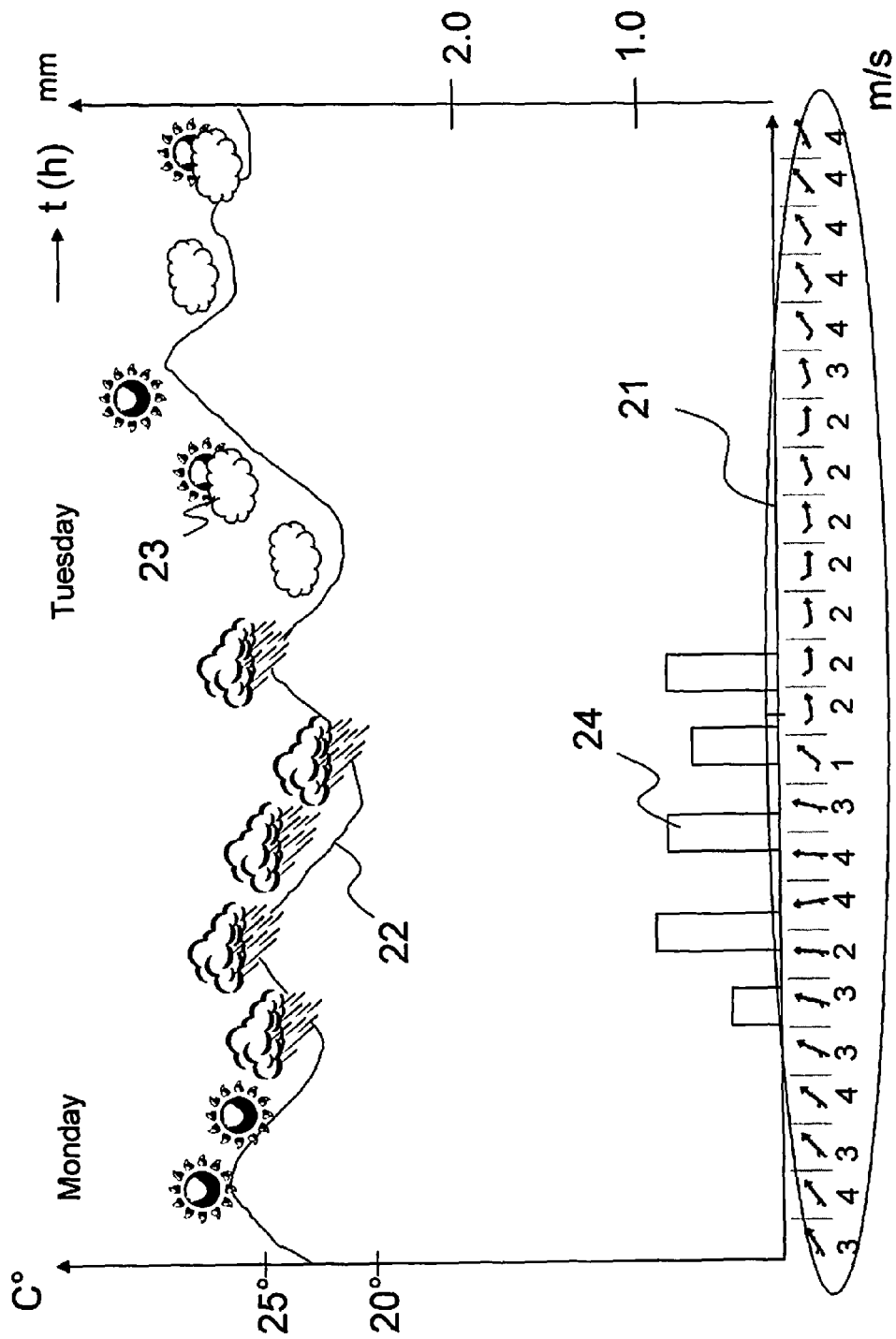
FIG. 2 is a schematic diagram depicting a weather forecast.

FIG. 2 is a typical weather forecast for a place in Sweden. Time is defined along the x-axis and stretches over 48 hours over Monday and Tuesday. The example illustrates among other things a 48 hours wind forecast 21, which wind forecast information may be used to accurately predict the power generation of a wind turbine at this location. It should be noted that the prediction may use a longer forecast, for example, a ten day forecast. A forecast may also comprise both wind as well as solar radiation forecasts that are useful for accurately predicting also the power generation from a solar panel. In FIG. 2, the solar radiation may be predicted from a solar forecast 22. In the illustrated forecast also temperature is indicated along the y-axis, left hand side, denoted as 23, and also precipitation 24 is defined along the y-axis, right hand side, which may be used to predict power generation from a water plant.

Embodiments herein may, based on these predictions of power generation, handle data traffic served by the radio base station 10 in accordance with a certain manner or rule. This way of handling data traffic is arranged so that the amount of data traffic that is transmitted over a time period will consume less power of the radio base station 10 than the available power generated by the power supply system of the radio base station.

Figure 3:
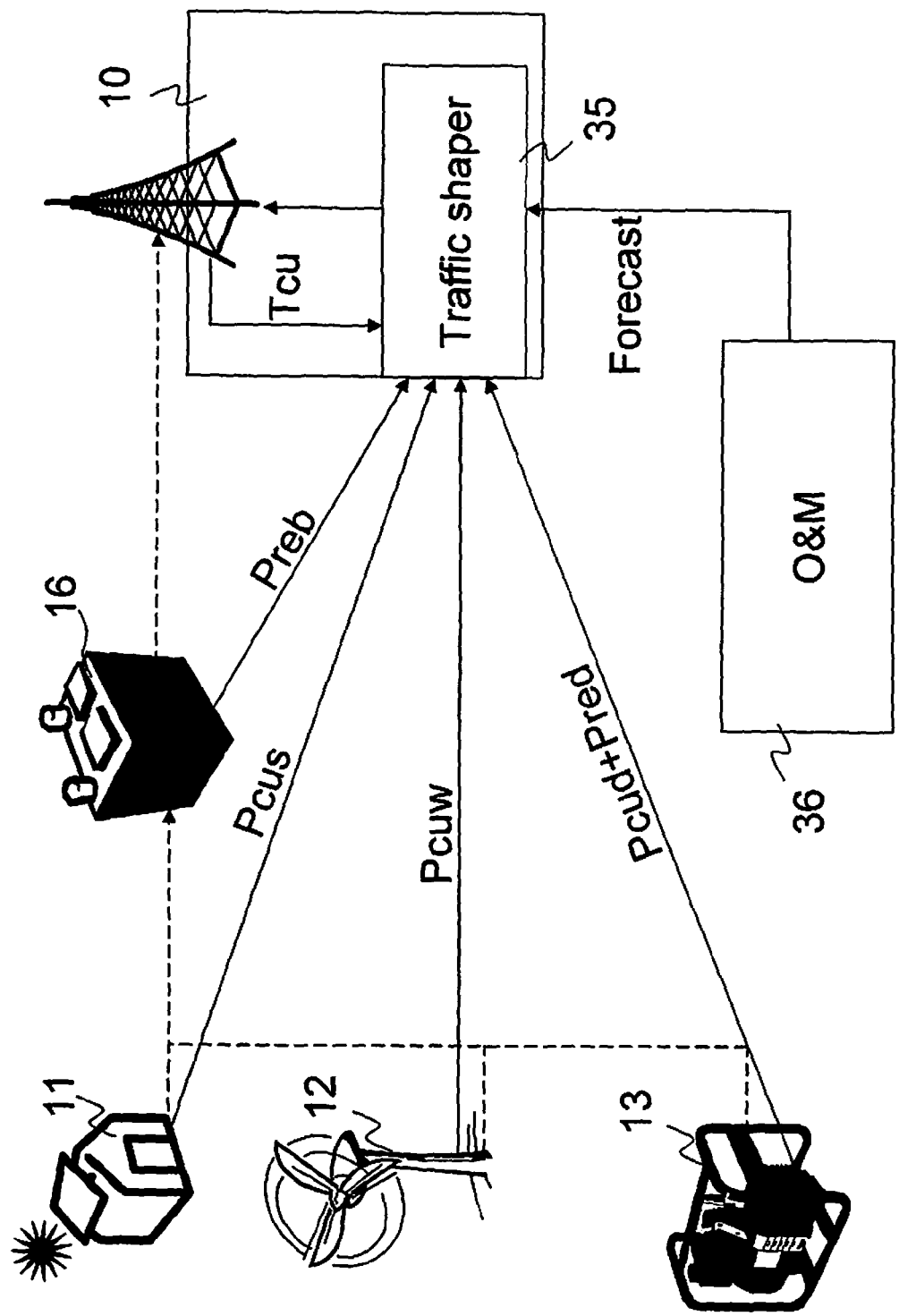
FIG. 3 is a schematic diagram showing a telecommunications network and a power supply system to a radio base station.

In FIG. 3, a schematic diagram depicting a cellular site in accordance with the present solution is shown. A telecommunications cellular off grid site is shown in the illustrated example. The illustrated site comprises at least one radio base station 10 but may comprise a plurality of radio base stations. The radio base station 10 may be powered by different energy sources, such as the illustrated examples of solar arrangement 11, wind arrangement 12, and/or diesel arrangement 13. Note that a site may not have all energy sources depicted in FIG. 3. Power supplied to the radio base station 10 via the battery 15 from the different energy sources is disclosed as a dashed line.

Information from the different energy sources 11-13 may be transmitted to a traffic shaper 35. The traffic shaper 35 may be implemented in a scheduler of the radio base station 10 but may also be handling data traffic before the scheduler in a layer 3 mechanism, that is, a mechanism servicing the Network layer and being responsible for transporting data traffic between devices. The traffic shaper 35 is arranged to set the radio base station 10 in lower capacity or performance state, or select to transmit less bits per second that would indicate to a function to set the radio base station 10 in a lower capacity or performance state, for example, by putting some components in low powered mode.

Thus, the solar arrangement 11 may transmit information about current solar power generation, Power Current Solar (Pcus), to the traffic shaper 35. The wind arrangement 12 may transmit information about current wind power generation, Power Current Wind (Pcuw), to the traffic shaper 35. The diesel arrangement 13 may transmit information about current diesel power generation, Power Current Diesel (Pcud), as well as indication of current diesel reserve, Power Reserve Diesel (Pred), to the traffic shaper 35. In addition, the battery may transmit information about current battery reserve, Power Reserve Battery (Preb).

Furthermore, a data traffic analysing arrangement in the radio base station 10 may analyse the current data traffic and transmit an indication of the current data traffic, data traffic Current (Tcu), to the traffic shaper 35. These indications power generation as well current data traffic may be used by the traffic shaper to shape the data traffic in a manner that will consume less power than generated from the energy sources 11-13.

Furthermore, as discussed above, the traffic shaper 35 may as well, in some embodiments, use a forecast to predict coming power generation. The forecast may be transmitted from an Operation and Maintenance (O&M) node 36. The forecast may comprise indications regarding, for example, wind speed forecast, solar radiation forecast, diesel refill forecast, data traffic forecast, and/or the like.

The traffic shaper 35 may then use the information of the current generated power as well future generated power, based on the received forecast, to calculate available power for the radio base station. Then, by considering current data traffic and future data traffic from data traffic forecast, the traffic shaper 35 may handle the data traffic in such a way that the available power will last according to a shaper rule. For example, the shaper rule may state that a number of emergency calls must always be handled during a preset time period.

Figure 4:
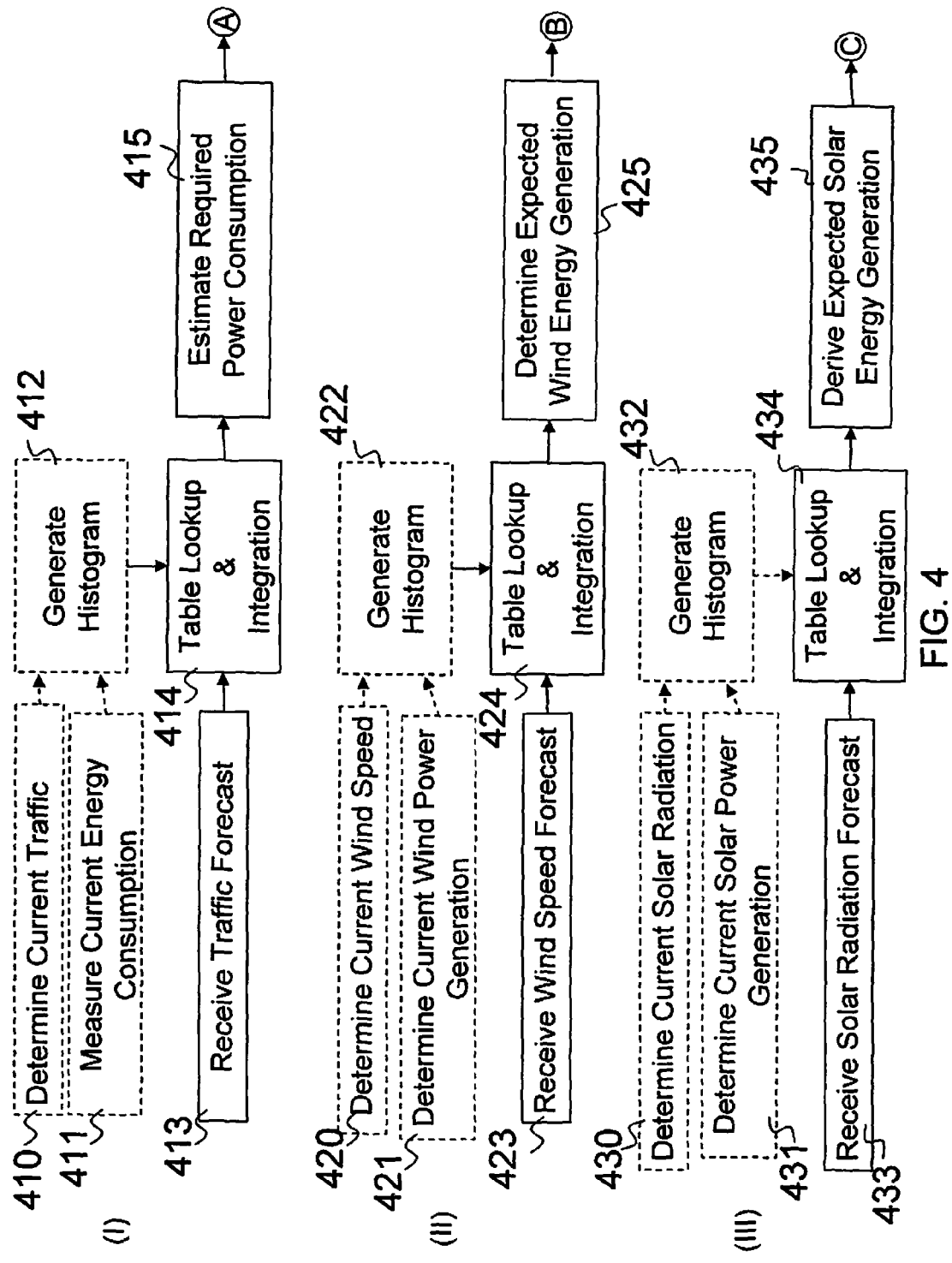
FIG. 4 is a schematic block diagram relating to different power estimates.

In order to estimate how much power the radio base station 10 will consume given a certain data traffic amount, historical energy measurements may be used. A histogram, that is, a table, may be constructed for this purpose so that the radio base station 10 is able to learn that whenever the served data traffic is X bits per second, the average energy consumption is expected to be Y±ΔY kW. FIG. 4 (I) is a schematic diagram depicting a method to estimate required power consumption for handle a predicted data traffic amount and an example how this may be used to, for example, determine restrictive data traffic shaping or not.

Step 410

The radio base station 10 determines current data traffic. This may be based on buffer load in the radio base station 10.

Step 411

The radio base station 10 measures power consumption during the handling of the determined current data traffic.

Step 412

The radio base station 10 then generates a histogram for power consumption related to current data traffic. This may be generated from a plurality of measurements of consumed power over different data traffic loads, that is, handling different amounts of data traffic.

Step 413

The radio base station 10 receives and analyses a data traffic forecast. This may be received from a O&M node, neighbouring radio base station 10 and/or the like.

Step 414

The radio base station 10 integrates the forecasted amount of data traffic from the histogram, that is, performing a table look up using the forecasted data traffic amount.

Step 415

The radio base station 10 estimates required power consumption from the table look up. This result is denoted as A in FIG. 4 (I).

FIG. 4(II) is a schematic diagram depicting a method to estimate expected wind power generation.

Step 420

The radio base station 10 determines current wind speed. This may be based on local measurement at the radio base station 10, received from the wind arrangement 12, received from the O&M node 36 or the like.

Step 421

The radio base station 10 determines the current wind power generation at the current wind speed. This may be received as data transmitted from the wind arrangement 12/battery 14.

Step 422

The radio base station 10 then generates a histogram for wind power generation related to current wind speed. This may be generated from a plurality of measurements of wind power generation at different current wind speeds.

Step 423

The radio base station 10 receives and analyses a wind speed forecast. This may be received from a O&M node, neighbouring radio base station 10 and/or the like.

Step 424

The radio base station 10 integrates the wind speed forecast into the histogram, that is, performing a table look up using the forecasted wind speed forecast.

Step 425

The radio base station 10 determines expected wind power generation from the table look up. This result is denoted as B in FIG. 4 (II).

FIG. 4(III) is a schematic diagram depicting a method to estimate expected solar power generation.

Step 430

The radio base station 10 determines current solar radiation. This may be based on local measurement at the radio base station 10, received from the solar arrangement 11, received from the O&M node 36 or the like.

Step 431

The radio base station 10 determines the current solar power generation with the current solar radiation. This may be received as data transmitted from the solar arrangement 11/battery 14.

Step 432

The radio base station 10 then generates a histogram for solar power generation related to current solar radiation. This may be generated from a plurality of measurements of solar power generation at different current solar radiations.

Step 433

The radio base station 10 receives and analyses a solar radiation forecast. This may be received from a O&M node, neighbouring radio base station 10 and/or the like.

Step 434

The radio base station 10 integrates the solar radiation forecast into the histogram, that is, performing a table look up using the forecasted solar radiation forecast.

Step 435

The radio base station 10 determines or derives the expected solar power generation from the table look up. This result is denoted as C in FIG. 4 (III).

Figure 5:
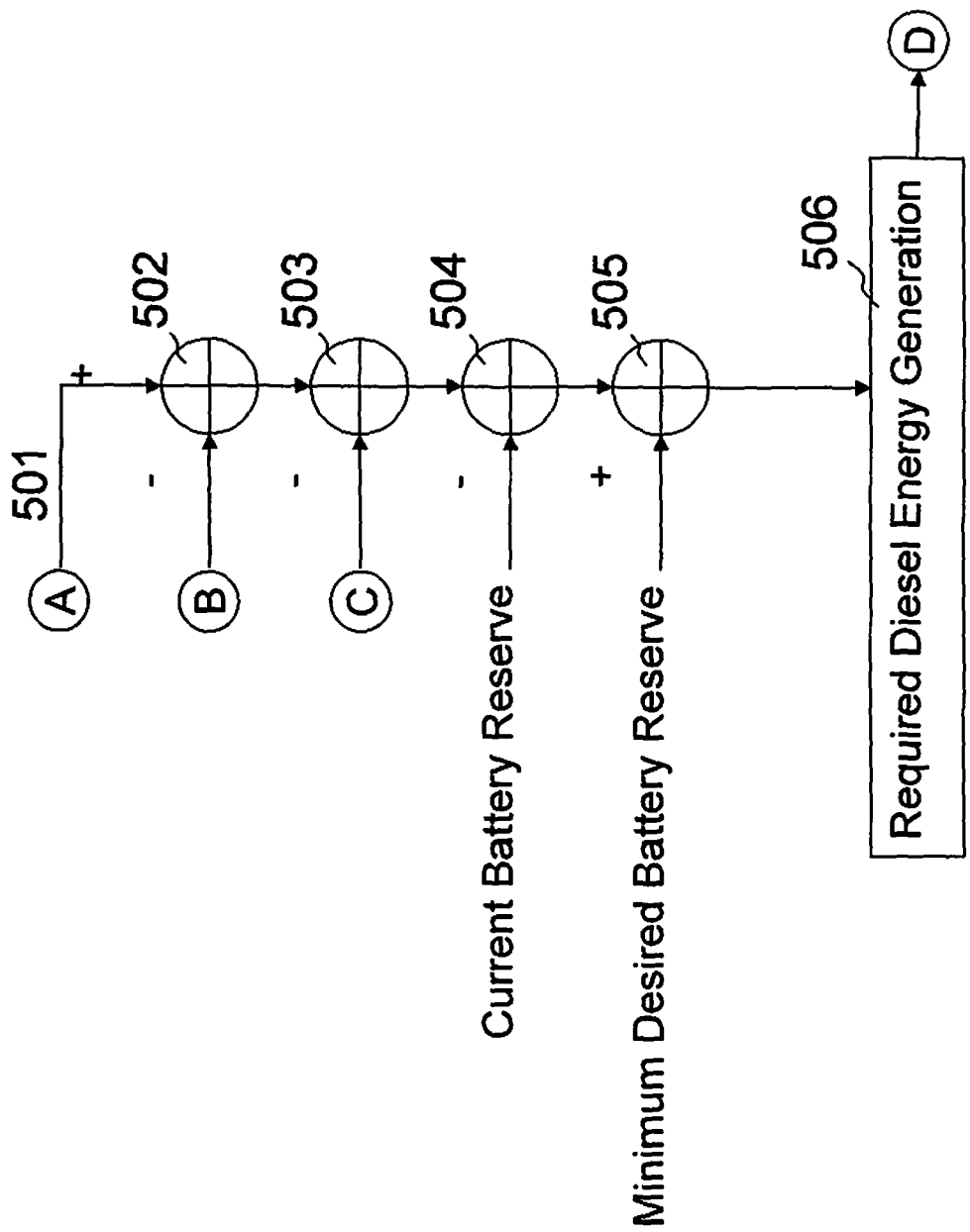
FIG. 5 is a schematic block diagram showing a method in a radio base station.

FIG. 5 is a schematic diagram depicting one away of using the results from FIG. 4. In the illustrated example a method for estimating a required diesel power generation based on the estimated results in FIG. 4 is shown.

Step 501

The estimated required power consumption result A from FIG. 4 (I) is provided as a start-up value in the estimation of the required diesel power generation.

Step 502

The estimated wind power generation result B from FIG. 4 (II) is subtracted from the required power consumption.

Step 503

The estimated solar power generation result C from FIG. 4 (III) is also subtracted from the required power consumption.

Step 504

A current battery reserve of the radio base station 10 or the power supply system is subtracted to the estimation.

Step 505

In order to always have a minimum battery reserve, a value of that minimum battery reserve is subtracted from the estimation.

Step 506

If the estimation results in a positive value, this indicates that a required diesel generation is needed to be able to provide enough power according to the estimated required power consumption. If the estimation results in a negative value, there is no need for diesel generation. The required diesel generation value is indicated as D in FIG. 5.

Figure 6:
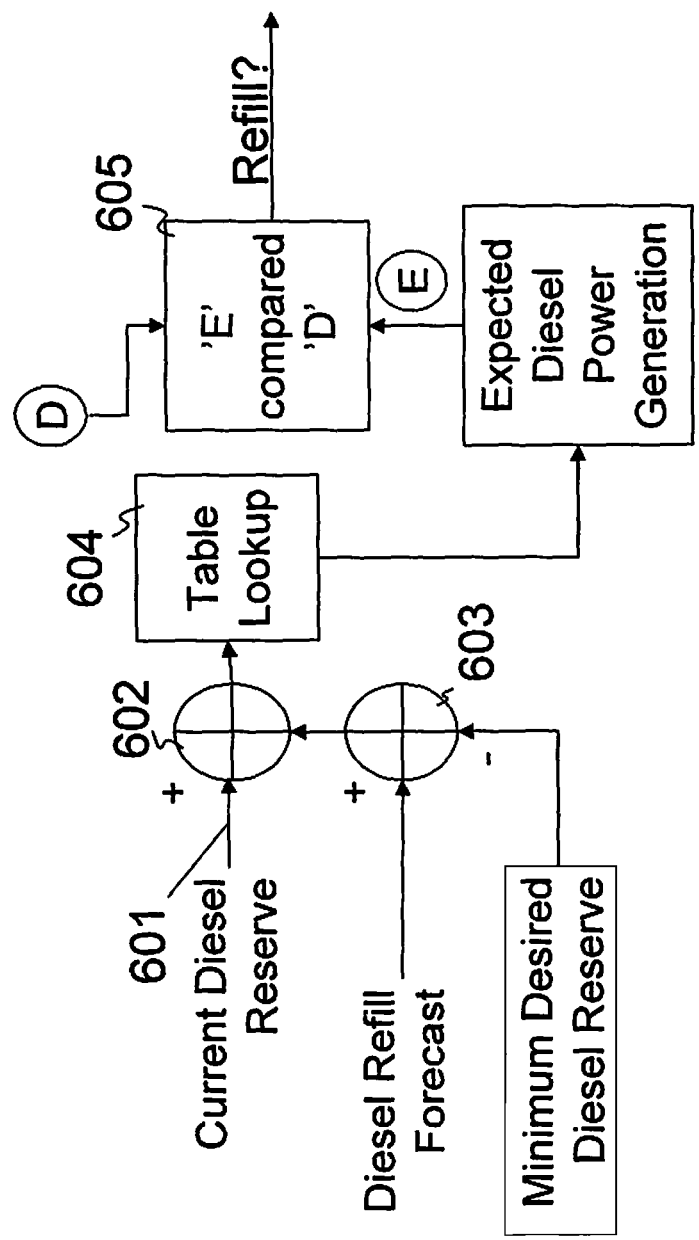
FIG. 6 is a schematic block diagram showing a method in a radio base station.

FIG. 6 is a schematic diagram depicting a method for comparing an expected diesel power generation, denoted as 'E' in FIG. 6, to the required diesel power D from FIG. 5.

Step 601

A current diesel reserve of the diesel arrangement 13 is provided to the estimation.

Step 602

A diesel refill forecast is added to the current diesel reserve. This may be based on a forecast of a weekly route a diesel fuel truck or the like.

Step 603

A minimum desired diesel reserve is subtracted from the current diesel reserve and the diesel refill forecast.

Step 604

The radio base station 10 then from a table performs a table look up to determine the expected diesel power generation 'E'.

Step 605

The required diesel power generation 'D' is then compared to the expected diesel power generation 'E'. From the comparison the radio base station 10 may determine whether the diesel reserve is to be refilled more often.

Figure 7:
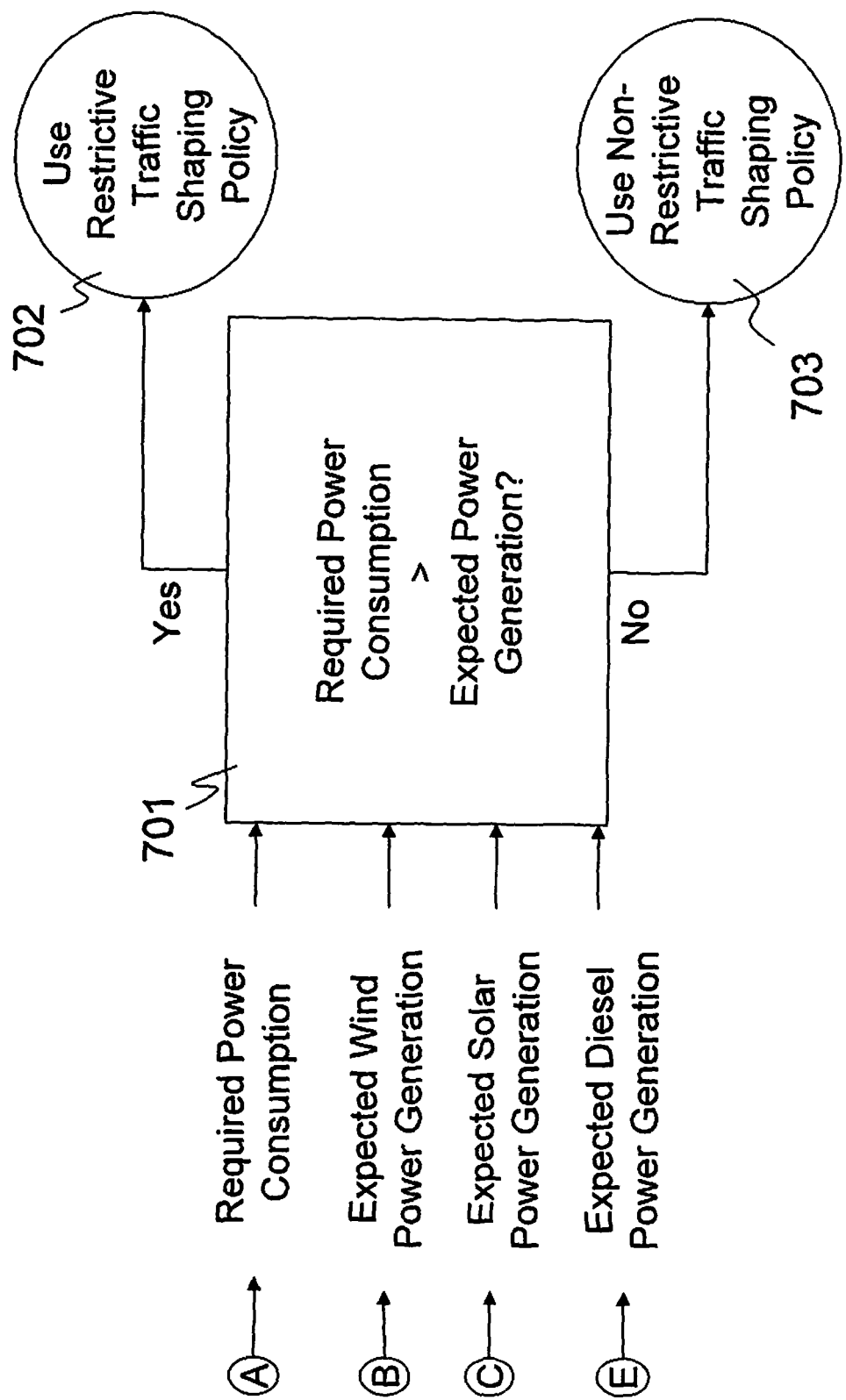
FIG. 7 is a schematic block diagram showing a method in a radio base station.

FIG. 7 is a schematic diagram depicting a method in the traffic shaper 35 to determine data traffic shaping using the estimated expected power generation of the different energy sources from FIG. 4 and FIG. 6.

Step 701

The required power consumption 'A' estimated in FIG. 4 (I) is compared to the sum of the estimated power generations 'B', 'C', 'E' of the wind arrangement 12, the solar arrangement 11, and the diesel arrangement 13.

Step 702

If the comparison results in that the required power consumption 'A' is greater than the sum of the estimated power generations 'B', 'C', 'E', the traffic shaper 35 will implement a more restrictive data traffic shaping policy.

Step 703

If the comparison results in that the required power consumption 'A' is less than the sum of the estimated power generations 'B', 'C', 'E', the traffic shaper 35 will use the current, for example, a non restrictive, data traffic shaping policy.

Hence, by comparing the required power consumption with the expected power generation from all available energy sources traffic shaper 35 decides if a restrictive data traffic shaping policy is required or not.

Figure 8:
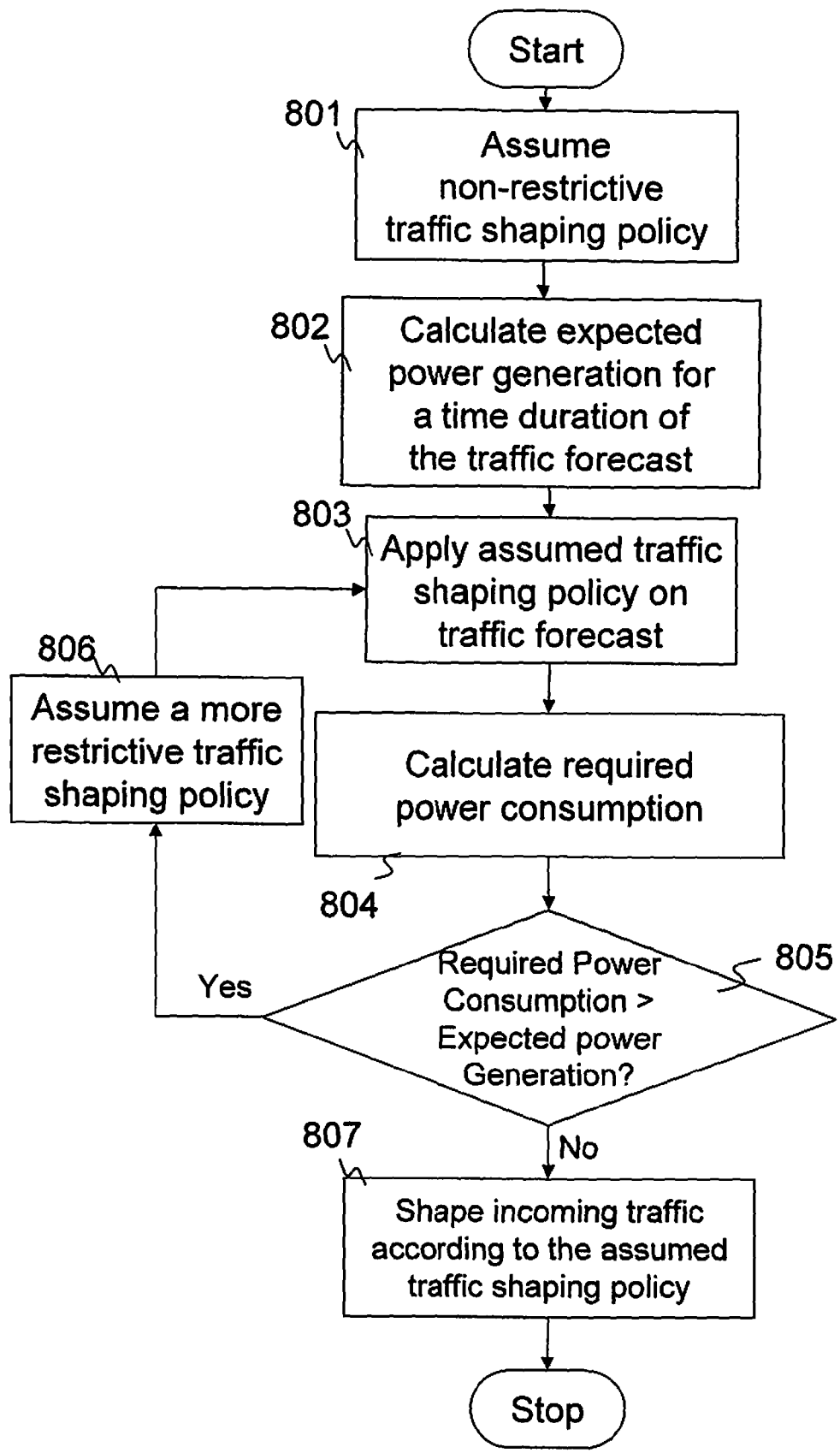
FIG. 8 is a schematic block diagram of a method in a radio base station.

FIG. 8 is a flow chart depicting an iterative process to determine data traffic shaping policy.

Step 801

The traffic shaper 35 assumes a non restrictive data traffic shaping policy of a data traffic forecast.

Step 802

The traffic shaper 35 calculates expected power generation for a time duration of the data traffic forecast.

Step 803

The traffic shaper 35 applies assumed data traffic shaping policy on the data traffic forecast.

Step 804

The traffic shaper 35 calculates required power consumption with assumed data traffic shaping policy of the data traffic forecast.

Step 805

The traffic shaper 35 compares the required power consumption with the expected power generation.

If it is determined that the required power consumption is greater than the expected power generation, denoted as 'Yes' in FIG. 8, the method flow continues with step 806.

Step 806

The traffic shaper assumes a more restrictive data traffic policy.

The new assumed data traffic shaping policy is then applied to the data traffic forecast, 803, and generates a new required power consumption, 804. The new required power consumption is then compared with the expected power generation, 805. This is an iterative process that continues until the expected power generation is larger than the required power consumption.

The traffic shaper 35 may assumes a more restrictive data traffic policy by limiting the amount of data transmitted by the radio base station 10. This may typically be performed by the scheduler in the radio base station 10, instructed by the traffic shaper 35, and/or by changing the configuration, i.e. by turning off equipment in the radio base station 10. For instance, a MIMO radio may be turned off, the system bandwidth may be reduced, the number of carrier supported in the sited may be reduced, and a reconfiguration from three radio sectors to a single omni sector may be performed. These actions are often seen as a second step—when the data traffic is limited to a certain amount by the traffic shaper 35 and consequently there is no use to have the extra equipment turned on.

Step 807

When the required power consumption is less than the expected power generation, denoted as 'No' in FIG. 8, the traffic shaper 35 shapes the data traffic according to the assumed data traffic shaping policy.

If a more restrictive data traffic shaping policy is required then this may first be imposed on low Quality of Service (QoS) or low priority data traffic and if this is not sufficient also medium QoS or medium priority data traffic may experience restrictive data traffic shaping.

Figure 9:
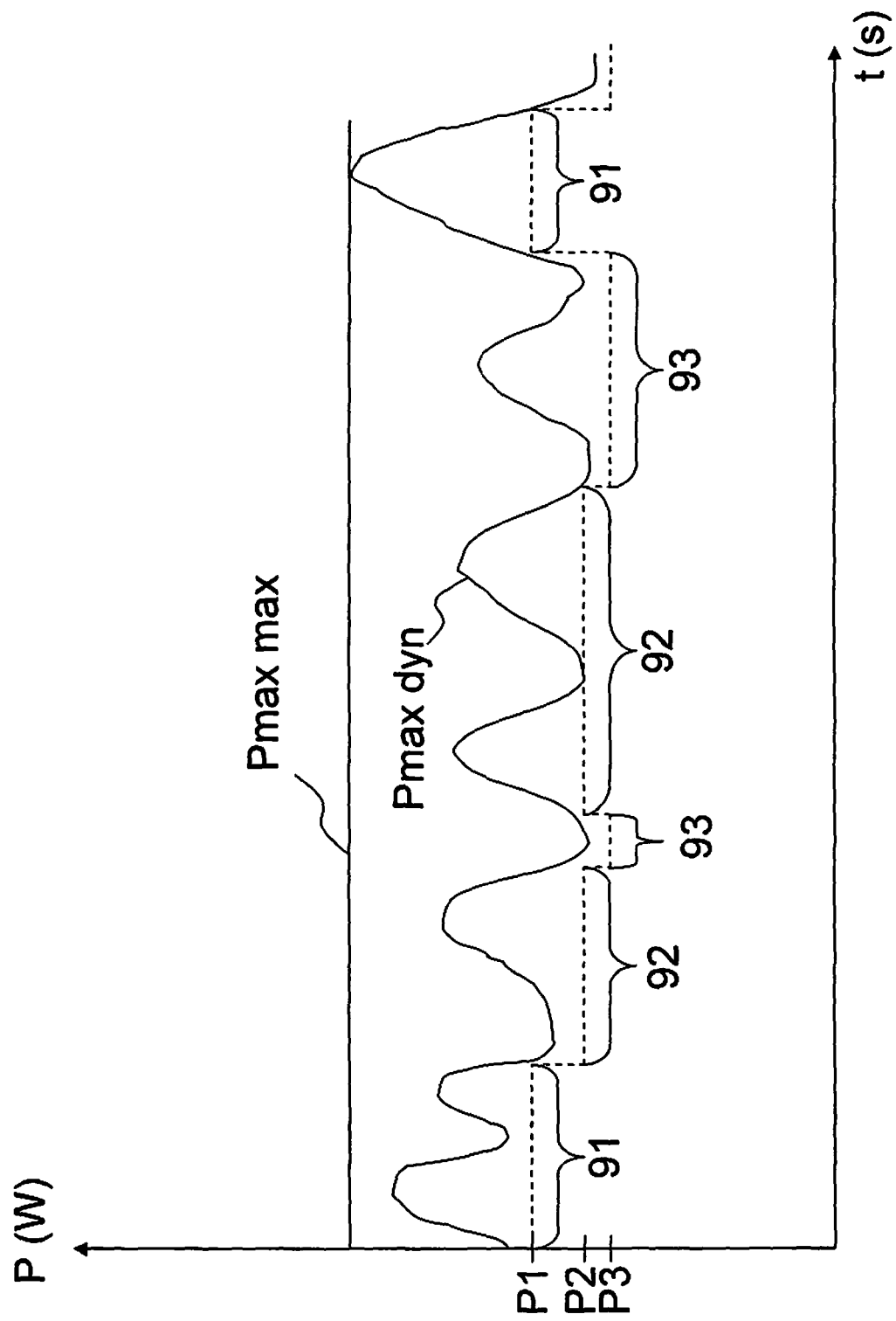
FIG. 9 is a schematic diagram depicting a graph defining available power in relation to time.

FIG. 9 is a graphical plot of maximum available power in relation to time. The x-axis defines power P(W) and the y-axis defines time t(s). In the plot a first line, Pmax max, illustrates the available power when the radio base station 10 is hooked up to a main electrical network.

However, a second line, Pmax dyn, schematically illustrates available power of a radio base station 10 power supplied by a dynamical power supply system, such as an off grid system or the like. The available power is here changing over time. The Pmax dyn may be based on current power generation and/or predicted future power generation from forecasts or the like. The traffic shaper 35 introduced in the radio base station 10 selects a data traffic shaping policy based on a history of power consumption and information of available power, in this case Pmax dyn.

For example, a dashed line illustrates power consumption of the radio base station 10 according to shaper rules. The traffic shaper 35 changes a data traffic shaping policy for handling an amount of data traffic when the available power generation drops below a required power consumption value for that amount of data traffic. The amount of data traffic may be based on current and a forecast of data traffic.

The traffic shaper 35 may handle the data traffic according to a first rule defining a data traffic shaping policy of no restrictions. A first power consumption value P1 is required to handle the amount of data traffic according to the first rule.

The traffic shaper 35 may handle the data traffic according to a second rule defining a restricted data traffic shaping policy, for example, the traffic shaper 35 instructs a scheduler in the radio base station 10 to drop low priority data traffic. A second power consumption value P2 is required to handle the amount of data traffic according to the second rule.

The traffic shaper 35 may handle the data traffic according to a third rule defining a restricted data traffic shaping policy, for example, the traffic shaper 35 instructs the scheduler in the radio base station 10 to drop low and medium priority data traffic. A third power consumption value P3 is required to handle the amount of data traffic according to the third rule.

As illustrated in FIG. 9, the traffic shaper 35 changes between the different data traffic shaping policies since the available power generation changes dynamically. For example, the traffic shaper 35 handles the data traffic according to the first rule over a time period, denoted as 91 in FIG. 9. Then, when the available power, Pmax dyn, drops below the required power consumption value P1, the traffic shaper 35 changes the data traffic shaping policy according to the second rule over a period of time, denoted as 92 in FIG. 9. Additionally, when the available power, Pmax dyn, drops below the required power consumption value P2, the traffic shaper 35 changes the data traffic shaping policy according to the third rule over a period of time, denoted as 93 in FIG. 9, and so on.

The data traffic handling may comprise different ways to limit the amount of transmitted data traffic, for example, a rule that defines to throw away best effort data traffic or to merely allow emergency calls within the cell, and/or changes the configuration of the radio base station 10 with a known energy consumption. In other words, the traffic shaper modifies the radio base station 10 to a lower performance.

In a simplified implementation, the traffic shaper 35 checks a buffer of the scheduler of the radio base station 10 35 to determine factual data traffic. As an example, the traffic shaper 35 checks every 10th ms how much power that has been consumed the last 10 ms. If the power consumption is below the maximum power for example, a power amount of ΔP. The ΔP may then be accumulated for later use, for example, used at a 10 ms period that exceeds the maximum power.

The traffic shaper 35 checks every 10th ms what kind of data traffic that is buffered in the scheduler. If the buffered data traffic may be transmitted without requiring more power than indicated by the maximum power or maximum power and accumulated power, the buffered data traffic is transmitted. If, however, the buffered data traffic may not be transmitted without requiring more power only parts of the buffer may be transmitted and the rest may be accumulated to the next 10 ms.

Some buffered data may be kept in the buffer too long and will be dropped. If the amount of data associated with a certain user equipment is dropped the connection to that user equipment may be disconnected.

If the buffer exceeds a certain threshold the radio base station 10 may drop a carrier or a connection to a user equipment.

In an example, the amount of handle data traffic in the radio base station 10 may be predicted and some temporary power consumptions over the maximum power, Pmax dyn, may be allowed. For example, the required power consumption may be over the maximum available power during busy hours and during other hours the maximum power is restricted even further.

Figure 10:
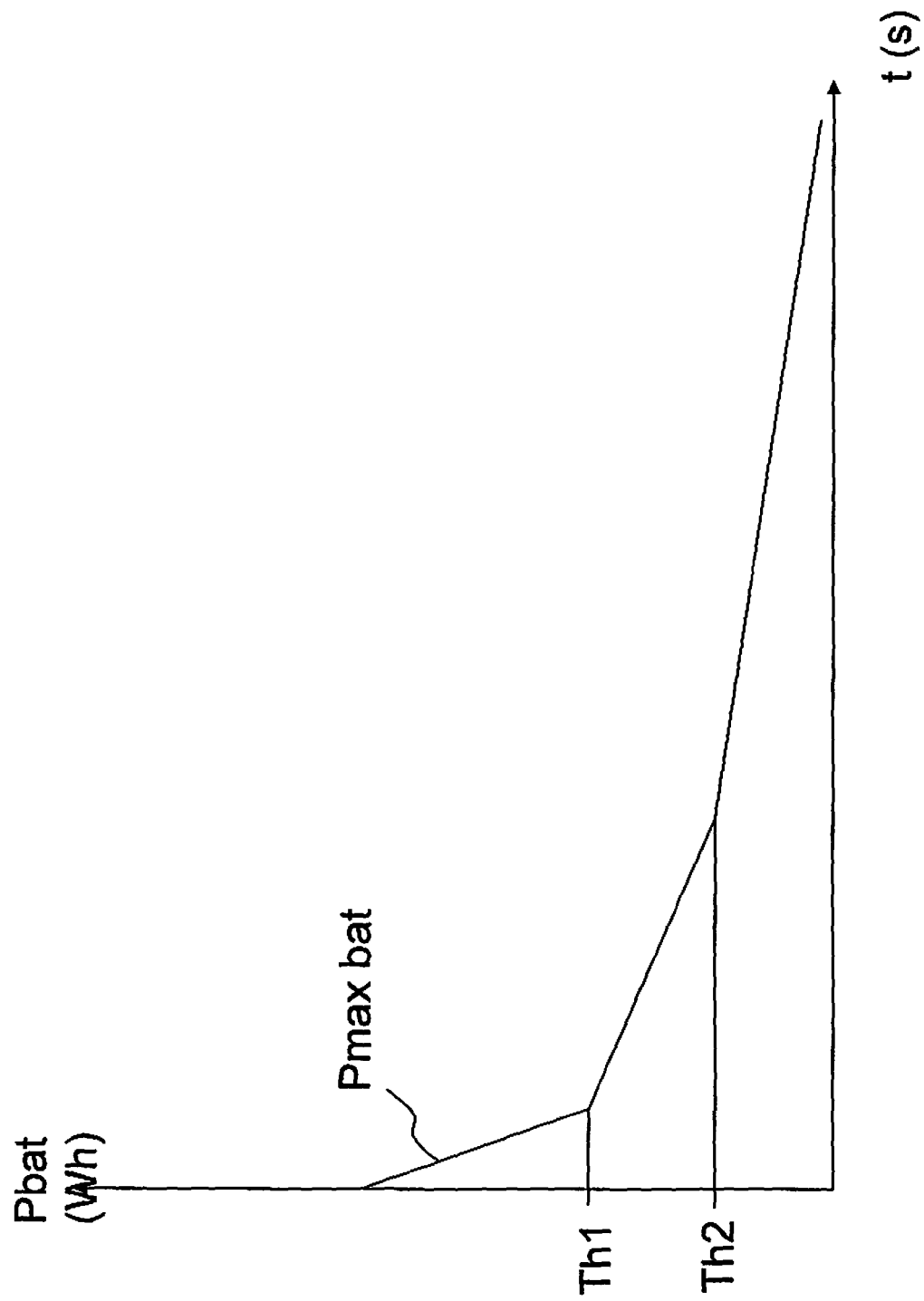
FIG. 10 is a schematic diagram depicting a graph defining available power in relation to time.

Note that the present invention is not only applicable to off grid sites. The power source may also be the Alternate Current (AC) mains, with peak power defined by the fuse size. FIG. 10 is a schematic diagram depicting a graph of a stored battery energy or power of a battery used as backup power to the radio base station 10 when powered by the AC mains. The y-axis defines the battery stored energy Pbat (Wh) and the x-axis defines the time t (s). The line Pmax bat defines the maximum available energy or power of the battery.

The common site solution is to ensure power supply via AC mains and in this case is the operator interested of minimizing or optimizing the size of the battery backup. Thus, the present solution is applicable as a backup solution in case the radio base station 10 loses the AC power. Such an event may then trigger the radio base station 10 to apply a restrictive data traffic policy, a first shaper rule, when the Pmax bat falls below a first threshold value, Th1. The radio base station 10 may then apply an even more restrictive data traffic shaping policy, a second rule, when the Pmax bat goes below a second threshold Th2. For example, the radio base station 10 may only handle emergency calls after the battery power has gone below Th2.

The available backup capacity is typically defined during the commissioning test of the site via the functionality "battery backup test". There are two ways of saving battery backup capacity. Either by using less backup capacity with decreased ampere hours (Ah) at the radio base station 10 and the dimensioning of Depth of Discharge (DoD) is 100%. This will save Capital Expenditures (CAPEX). The other way is dimensioning the battery backup DoD 25% which will increase the life cycle of the battery. This will reduce Operational Expenditures (OPEX).

Different scenarios may be set up when AC fails. For example, when the AC fails, the radio base station 10 only supports certain bearers, e.g. voice services.

When the AC fails, the radio base station 10 supports all services with reduced capacity, with data traffic shaping applied, for 2 h, and then only voice services.

After a mains failure the main resources are normally heavily utilized to handle all extra loads, in grid, external site, coming from on/off thermostat regulators requiring full power at the same time due to the inactivity during the main failure. In this start up phase it may be required to imply data traffic restrictions in order to reduce the power needed to feed the equipment at the radio base station 10, both Alternate Current (AC) and Direct Current (DC).

As always it is a trade off between the value of the power not consumed and the value of the lost or expected loss of the data traffic which had needed the power not consumed. In situations with frequent main failures comes also a cost for battery wear out if they are not charged as soon as possible. Battery charging is dependant of the availability of the grid.

A normal design of a power supply system is that all rectifiers start up to work at full speed and the battery recharging starts immediately if the battery has the right voltage level. During normal conditions after mains failure a critical load is power supplied and the rest of the load is reconnected in a sequence at the radio base station 10. The critical load may be defined by an operator.

For non-normal main situations a lot of different sequential connections may be beneficial.

Cut out the redundant or charging power source unit.

Run only the transmission equipment of the radio base station 10.

Control the voltage on batteries so no charging/low charging current goes to the batteries, also called retarded charging.

Abnormal situations have to be handled individually and the operator shall decide by information from the system. At Operation Support System (OSS)-level the radio base station 10 may be specified according to AC-grid quality.

Exemplary may two methods, stated above, be used to save power during start-up:

By limiting the amount of data transmitted by the radio base station 10. This may typically be performed by the scheduler in the radio base station 10, instructed by the traffic shaper 35.

By changing the configuration, i.e. by turning off equipment in the radio base station 10. For instance, a MIMO radio may be turned off, the system bandwidth may be reduced, the number of carrier supported in the sited may be reduced, and a reconfiguration from three radio sectors to a single omni sector may be performed. These actions are often seen as a second step—when the data traffic is limited to a certain amount by the traffic shaper 35 and consequently there is no use to have the extra equipment turned on.

The radio base station 10 may maintain a model for the amount of power being consumed for different configurations, and for different data traffic cases. This may either be determined at production or design, or measured for the individual radio base station 10 by comparing data traffic or configurations with power consumption measurements.

The core network sets the QoS of different radio bearers by setting the QoS indicators for the bearer. This is done as a normal step in procedure of setting up of the bearer. This information may be used by the traffic shaper 35 to determine what data traffic to let through:

The operator may configure to only let certain bearers, with certain QoS indicators, be transmitted when X kWh are left in total power supply, e.g. in the batteries.

The operator may let the traffic shaper 35 connected to a Media Access Control Scheduler to optimize the QoS given a limit of total power consumption.

The method steps in the radio base station, referred to as radio base station 10 in the figures, for handling data traffic within a cell of the radio base station 10 in a power efficient manner according to some general embodiments will now be described with reference to a flowchart depicted in FIG. 11. The steps do not have to be taken in the order stated below, but may be taken in any suitable order. The radio base station 10 is comprised in a radio communications network.

Step 111

The radio base station 10 determines a maximum power, which maximum power indicates available power to radio base station.

Step 112

The radio base station 10 compares the maximum power to a threshold power value.

Step 113

The radio base station 10 handles data traffic served by the radio base station 10 according to a shaper rule when the maximum power is below the first threshold power value. The shaper rule is defined to handle data traffic in such a way that an amount of data traffic, transmitted over a time period, is reduced consuming less power of the radio base station 10 than if the data traffic is handled according to a basic rule when the maximum power is above the threshold power value.

Figure 12:
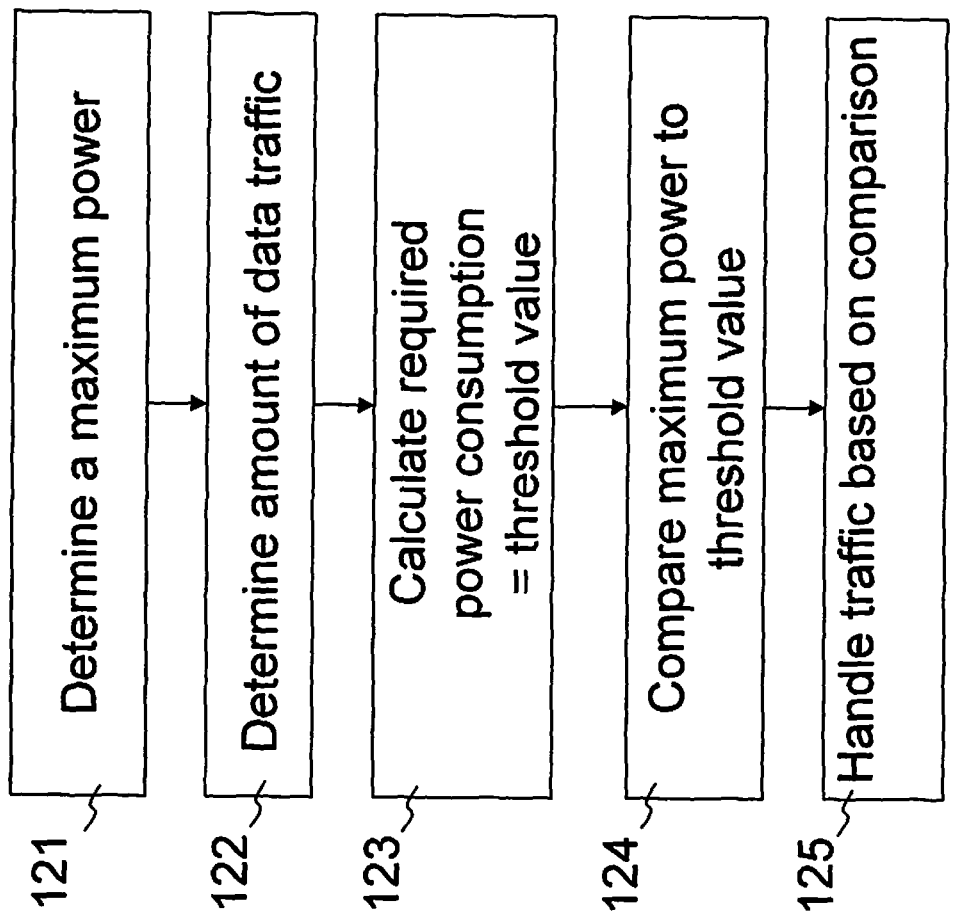
FIG. 12 is a flow chart depicting further embodiments of the present solution.

The method steps in the radio base station 10 for handling data traffic within a cell of the radio base station 10 in a power efficient manner according to some further embodiments will now be described with reference to a flowchart depicted in FIG. 12. The steps do not have to be taken in the order stated below, but may be taken in any suitable order.

Step 121

The radio base station determines a maximum power, which maximum power indicates available power to radio base station. The step 121 of FIG. 12 corresponds to the step 111 of FIG. 11.

This step may take the available generated power into account when determining the maximum power. The maximum power may take a fuse rating of a fuse in the radio base station 10 into account. In addition, embodiments herein disclose methods where an instant power generated from the power generation may be measured.

Figure 11:
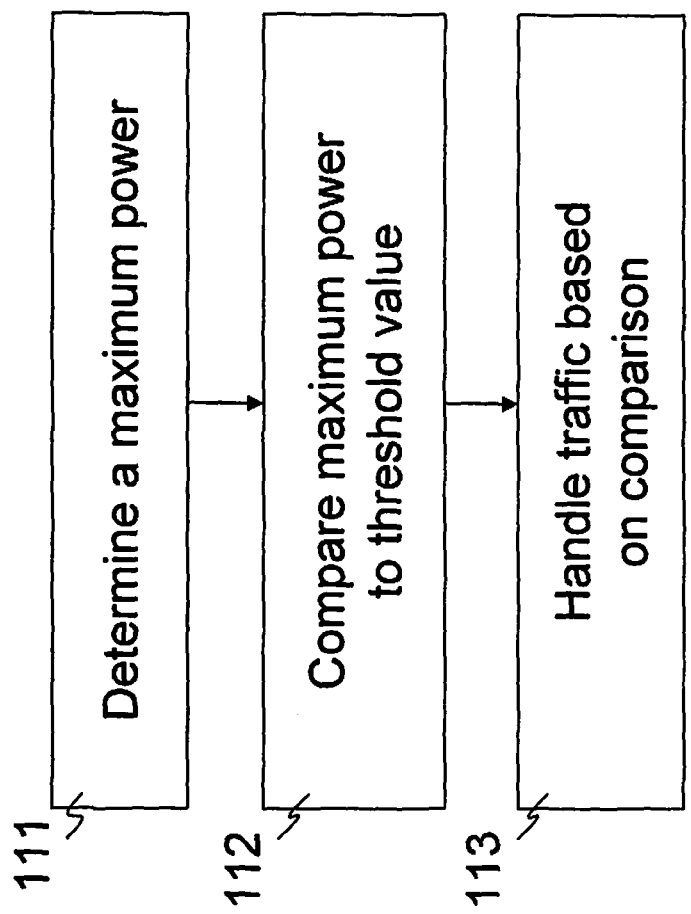
FIG. 11 is a flow chart depicting a method in a radio base station.

In some embodiments, wherein the radio base station 10 is at least party power supplied from an off grid power generation, the radio base station 10 calculates expected power generation of the off grid power generation over a time period, that may be different or the same as the time period of step 113 in FIG. 11. The radio base station may take the calculated expected power generation into account when determining the maximum power.

The expected power generation may be based on a current power generation and/or a prediction of power generation based on a forecast of a power source of the current power generation.

The radio base station 10 may be power supplied by at least an alternate current network. When a power failure from the alternate current network occurs the radio base station is triggered to determine the maximum power and the maximum power is determined based on an available battery energy reserve at the power failure.

Step 122

This is an optional step. The radio base station determines an amount of data traffic to be transmitted. The amount of data traffic may be based on, a buffer load in a buffer of the radio base station 10, analysing amount of data traffic of a preset previous time period, a preset value stored in the radio base station, and/or a forecast of amount of data traffic received from an operation and maintenance node.

Step 123

This is an optional step. The radio base station 10 calculates a required power consumption required to handle the data traffic according to an assumed rule. The assumed rule may be represented by the basic rule or the shaper rule, as stated in steps 113 or 125.

Step 124

The radio base station compares the maximum power to a threshold power value. The threshold power value may be preset. In embodiments wherein the radio base station calculates a required power consumption the threshold power value may be based on the calculated required power consumption.

Step 125

The radio base station handles the data traffic served by the radio base station 10 according to a shaper rule when the maximum power is below the first threshold power value. The shaper rule is defined to handle data traffic in such a way that an amount of data traffic transmitted over a time period is reduced consuming less power of the radio base station 10 than if the data traffic is handled according to a basic rule when the maximum power is above the threshold power value.

In some embodiments, the radio base station 10 limits the amount of data transmitted by the radio base station 10 by discarding data traffic with low priority, and/or modifying the configuration of the radio base station 10 to a lower performance configuration.

In some embodiments, when the maximum power is determined based on an available battery energy reserve at the power failure, as stated above in step 122, a second threshold power value Th2 is preset in the radio base station 10. The data traffic is handled according to a second rule when the available power reserve goes below the second threshold power value. The second rule is arranged for the data traffic handling to consume less power of the radio base station 10 than to handle data traffic according to the shaper rule by transmitting less data traffic over the period of time than transmitting data traffic according to the shaper rule.

In addition, the power stored in the battery 16 or batteries may be estimated, by integrating the power going into them.

The radio base station 10 determines the average allowed power consumption. The averaging period may be based on the power source used, e.g. 24 h for solar arrangement 11, seconds for AC power 15. This value may also be a configured value, e.g. AC fuse size.

The radio base station 10 uses the average power consumption as basis for the data traffic shaping.

When the power stored in the battery 16 is estimated to be less than a predefined threshold, the data traffic shaping becomes more restrictive.

When the radio base station 10 is AC powered, the maximum power will give that the radio base station 10 runs without limitation while the AC is there, and while the battery 16 have sufficient power left in them. When the available power in the batteries goes below a certain amount, the data traffic restrictions may kick in. This limit may be set to the full capability of the battery 16, to make the limit kick in at once.

For a solar powered radio base station 10, the limit will be there all the time, and adapted to the average power generated by the panels. When the battery 16, storing the power, is almost drained, the limit will become more restrictive.

The current invention may also be used to tune the fuse rating or a power consumption level of the radio base station 10. If the operator wants to keep a certain fuse rating of the radio base station 10, the radio base station 10 may be configured to use at most a certain amount of power set up as the maximum power.

The present solution may also be combined with an adaptation to other equipment on the radio base station 10 or a site comprising the radio base station 10. If a small over-consumption buffer is installed, such as a capacitor or battery, the radio base station 10 may be informed about when the rated AC power is superseded, and may quickly apply a limitation.

The data traffic shaping may also be used to slow start the radio base station 10 once the AC comes back after an AC failure. This will decrease the load on the AC network. This is implemented as a slow, for example, a few seconds, ramp up of the restrictive data traffic shaping rather than a one-step removal of the limit e.g. sequenced re-connection of load at the radio base station 10.

Figure 13:
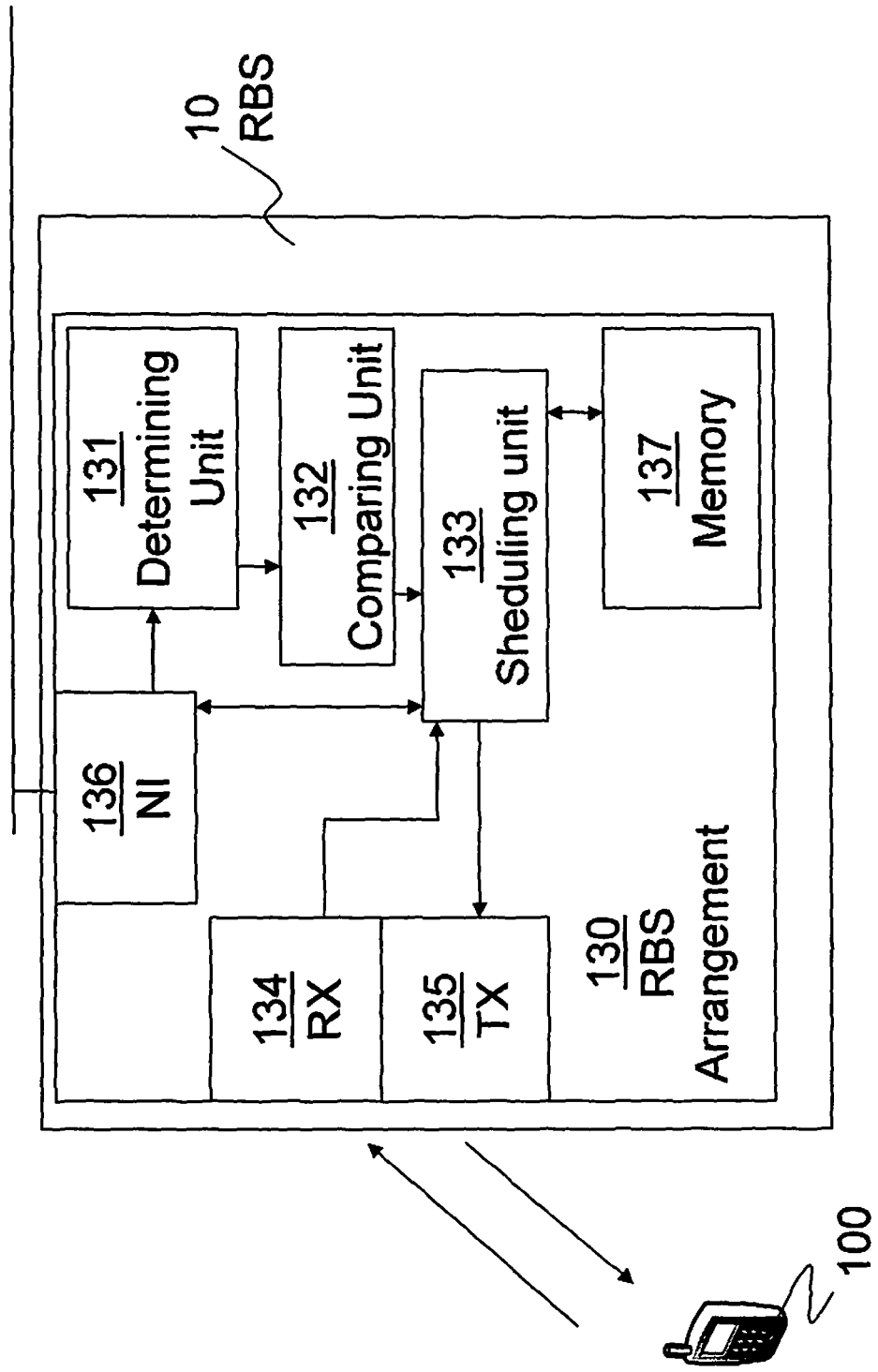
FIG. 13 is a schematic block diagram depicting embodiments of a radio base station.

In order to perform the method an arrangement 130 in a radio base station 10 is provided, as shown in FIG. 13. The arrangement 130 comprises a determining unit 131 arranged to determine the maximum power. The arrangement 130 further comprises a comparing unit 132 arranged to compare the maximum power to the threshold power value. In addition, the arrangement 130 comprises a handling unit 133 arranged to handle data traffic served by the radio base station 10 according to the shaper rule when the maximum power is below the first threshold power value. The determining unit 131, the comparing unit 132 may be part of the traffic shaper 35. The traffic shaper may be comprised in a scheduler also comprising the handling unit 133.

The arrangement may further comprise a receiving unit RX 134 arranged to receive data traffic from a user equipment 100 and a transmitting unit TX 135 arranged to transmit data traffic to the user equipment 100. The transmitting unit 135 may be comprised in the handling unit 133 and may comprise a power amplifier to be used to transmit the data traffic.

Furthermore, the arrangement 130 may comprise a network interface NI 136 over which the arrangement 130 receives information regarding, for example, amount of data traffic, power generation, forecasts and/or the like.

In addition, the arrangement 130 may comprise a memory unit 137 arranged to have data traffic, forecasts, applications to perform the method when executed within the arrangement and/or the like stored thereon. The memory unit 137 may be represented by a single memory unit or a plurality of memory units; internal and/or external.

In the drawings and specification, there have been disclosed exemplary embodiments of the invention. However, many variations and modifications may be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a radio base station for handling data traffic within a cell of the radio base station, wherein the radio base station is included in a telecommunications network and the method comprises:
    determining a maximum power, indicating an available power for the radio base station, wherein the available power is at least one of present available power and future available power, as generated by a power supply system of the radio base station;
    calculating a required power consumption in dependence on an amount of data traffic to be transmitted;
    determining a threshold power value based on the required power consumption;
    comparing the maximum power to the threshold power value; and
    handling data traffic served by the radio base station according to a shaper rule when the maximum power is below the threshold power value, wherein the shaper rule causes a scheduler in the radio base station to reduce the amount of data traffic that is transmitted over a given time period in comparison to the amount that would have been transmitted according to a basic rule used when the maximum power is above the power threshold value, and, thereby causes the radio base station to consume less power over the given period of time than would have been consumed if the data traffic were handled according to the basic rule.

2. The method of claim 1, wherein the radio base station is at least partly power supplied from an off-grid power source, and wherein the step of determining the maximum power comprises calculating an expected power generation of the off-grid power source over a second time period and accounting for the expected power generation, as said future available power, when determining the maximum power.

3. The method of claim 2, wherein the expected power generation is based on a current power generation, as said present available power, of the off-grid power source.

4. The method of claim 2, wherein the expected power generation is based on a prediction of power generation, as said future available power, that is based on a forecast for the off-grid power source.

5. The method of claim 1, wherein determining the maximum power takes an available generated power, as said present available power, into account.

6. The method of claim 1, wherein determining the maximum power takes a fuse rating of a fuse in the radio base station into account.

7. The method of claim 1, further comprising:
    determining an amount of data traffic to be transmitted; and
    wherein calculating the required power consumption in dependence on data traffic comprises calculating the power consumption required to handle the amount of data traffic to be transmitted if such transmission is performed in accordance with the rule for handling data traffic that is presently in use by the radio base station.

8. The method of claim 7, wherein determining the amount of data traffic is based on at least one of: a buffer load in a transmit buffer of the radio base station; analysis of the amount of data traffic from a preset previous time period; a preset value stored in the radio base station; and a forecast of the amount of data traffic received from an operation and maintenance node in the telecommunications network.

9. The method of claim 1, wherein an alternate current network supplies the radio base station with power, and wherein a power failure of the alternate current network triggers said determining of the maximum power, and further wherein said determining is based on an available battery energy reserve at the power failure.

10. The method of claim 9, wherein a second threshold power value is preset and the data traffic is handled according to a second rule when an available power reserve goes below the second threshold power value, wherein the second rule is configured so that the data traffic handling consumes less power of the radio base station than would be consumed by handling data traffic according to the shaper rule, based on the scheduler transmitting less data traffic over the period of time than would be transmitted according to the shaper rule.

11. The method of claim 1, wherein rule-based handling of data traffic to reduce power consumption limits the amount of data transmitted by the radio base station, based on the radio base station discarding data traffic with a low priority.

12. An arrangement that is configured for handling data traffic within a cell of a radio base station operating in a telecommunications network, said arrangement comprising processing circuitry configured to:
   determine a maximum power that indicates available power for the radio base station, wherein the available power is at least one of present available power and future available power, as generated by a power supply system of the radio base station; and
   calculate a required power consumption in dependence on an amount of data traffic to be transmitted, and determine a threshold power value based on the required power consumption;
   compare the maximum power to the threshold power value; and
   handle data traffic served by the radio base station according to a shaper rule when the maximum power is below the first threshold power value, wherein the shaper rule causes a scheduler in the radio base station to reduce an amount of the data traffic transmitted over a given time period in comparison to the amount that would have been transmitted according to a basic rule used when the maximum power is above the power threshold value, and thereby causes the radio base station to consume less power over the given time period than would have been consumed if the data traffic were handled according to the basic.

13. The arrangement of claim 12, wherein the arrangement comprises part of said radio base station.

14. A radio base station comprising:
   a transmit circuit configured for transmitting data traffic to user equipment;
   a scheduler circuit configured to schedule data traffic transmissions; and
   a handling circuit configured to:
      calculate an expected power generation for a time period associated with forecasted data traffic;
      calculate a required power consumption of the radio base station for the time period, assuming that the scheduler circuit performs scheduled transmissions of the forecasted data traffic according to a non-restrictive traffic shaping policy;
      if the required power consumption for the time period does not exceed the expected power generation for the time period, shape actual data traffic during the time period, according to the non-restrictive traffic shaping policy;
      if the required power consumption for the time period exceeds the expected power generation for the time period:
         select a more restrictive traffic shaping policy that, when assumed for use by the scheduler circuit for the forecasted data traffic during the associated time period, results in the calculated power consumption not exceeding the expected power generation; and
         shape the actual data traffic during the time period, according to the selected more restrictive traffic shaping policy.

15. A method performed by a radio base station comprising:
   calculating an expected power generation for a time period associated with data traffic forecasted to be transmitted for a cell of the radio base station for a corresponding time period;
   calculating a required power consumption of the radio base station for the time period, assuming that a scheduler circuit of the radio base station performs scheduled transmissions of the forecasted data traffic according to a non-restrictive traffic shaping policy;
   if the required power consumption for the time period does not exceed the expected power generation for the time period, shaping actual data traffic incoming to the radio base station during the time period, according to the non-restrictive traffic shaping policy; and
   if the required power consumption for the time period exceeds the expected power generation for the time period:
      selecting a more restrictive traffic shaping policy that, when assumed for use by the scheduler circuit for the forecasted data traffic during the associated time period, results in the calculated power consumption not exceeding the expected power generation; and
      shaping the actual data traffic during the time period, according to the selected more restrictive traffic shaping policy.

* * * * *